(12) United States Patent
Jang

(10) Patent No.: US 9,571,755 B2
(45) Date of Patent: Feb. 14, 2017

(54) SYSTEM FOR PRODUCING USER-SELECTIVE HD SYNTHESIS VIDEO

(71) Applicants: MUVIZONE CO., LTD., Seoul (KR); Yeon Hwan Jang, Seoul (KR)

(72) Inventor: Yeon Hwan Jang, Seoul (KR)

(73) Assignees: MUVIZONE CO., LTD., Seoul (KR); Yeon Hwan Jang, Seoul (KR)

( * ) Notice: Subject to any disclaimer, the term of this patent is extended or adjusted under 35 U.S.C. 154(b) by 0 days.

(21) Appl. No.: 14/784,288

(22) PCT Filed: Jul. 4, 2013

(86) PCT No.: PCT/KR2013/005941
§ 371 (c)(1),
(2) Date: Oct. 14, 2015

(87) PCT Pub. No.: WO2014/193027
PCT Pub. Date: Dec. 4, 2014

(65) Prior Publication Data
US 2016/0057360 A1 Feb. 25, 2016

(30) Foreign Application Priority Data
May 28, 2013 (KR) ........................ 10-2013-0060229

(51) Int. Cl.
| H04N 5/77 | (2006.01) |
| H04N 5/93 | (2006.01) |
| H04N 5/265 | (2006.01) |
| H04N 21/854 | (2011.01) |
| H04N 21/81 | (2011.01) |
| G11B 27/00 | (2006.01) |
| G11B 27/036 | (2006.01) |
| H04N 5/275 | (2006.01) |

(52) U.S. Cl.
CPC ............. *H04N 5/265* (2013.01); *G11B 27/005* (2013.01); *G11B 27/036* (2013.01); *H04N 5/275* (2013.01); *H04N 21/8146* (2013.01); *H04N 21/854* (2013.01)

(58) Field of Classification Search
CPC ...... H04N 5/265; H04N 5/275; H04N 21/854; H04N 21/8146; G11B 27/005; G11B 27/036
USPC ............... 386/224, 230, 231, 248, 278, 279, 282,386/285, 291, 299, 337
See application file for complete search history.

(56) References Cited

FOREIGN PATENT DOCUMENTS

| JP | 2001-100306 A | 4/2001 |
| JP | 02004029758 | * 1/2004 |

(Continued)

OTHER PUBLICATIONS

International Search Report for PCT/KR2013/005941 mailed Oct. 16, 2013 from Korean Intellectual Property Office.

*Primary Examiner* — Robert Chevalier
(74) *Attorney, Agent, or Firm* — Revolution IP, PLLC

(57) ABSTRACT

A system for producing a user-selective HD synthesis video, including: a camera device for providing data of an HD video captured for chroma-key synthesis; an audio device for providing HD audio data; and a system main body which receives the HD video data and the HD audio data from the camera device and the audio device, synthesizes, in real-time, the HD video data and the HD audio data with background video data or background image data selected by a user as an HD video using a chroma-key synthesis scheme, and selectively stores the HD synthesis video data in an external memory device.

3 Claims, 5 Drawing Sheets

(56) References Cited

FOREIGN PATENT DOCUMENTS

| KR | 10-2001-0074021 A | 8/2001 |
| KR | 10-2002-0074613 A | 10/2002 |
| KR | 10-2007-0078110 A | 7/2007 |

\* cited by examiner

SYSTEM FOR PRODUCING USER-SELECTIVE HD SYNTHESIS VIDEO

CROSS REFERENCE TO PRIOR APPLICATIONS

This application is a National Stage Application of PCT International Patent Application No. PCT/KR2013/005941 filed on Jul. 4, 2013, under 35 U.S.C. §371, which claims priority to Korean Patent Application No. 10-2013-0060229 filed on May 28, 2013, which are all hereby incorporated by reference in their entirety.

TECHNICAL FIELD

The present invention relates to a system for producing a synthesis video, and more particularly, to a system for producing a user-selective high-definition (HD) synthesis video, which synthesizes, in real-time, a video captured by a camera with a background video or a background image selected by a user using a chroma-key synthesis scheme, and stores, in real-time, a synthesized HD video in an external memory device to protect personal privacy.

BACKGROUND ART

As an Internet user environment has advanced, an image production field, which had been the province of specialists, has become increasingly common. A variety of internet sites which share video files based on the Internet are provided where users may upload, post, and share their video files.

There are a great variety of methods for producing videos, e.g., a method using high-priced technical equipment and a simple method using a smart phone. The video which is directly produced by a personal user is called a user created content (UCC) video. Personal users' desires to produce videos and expression methods are increasing, and the personal users' desires to express UCC video through image synthesis are also increasing.

A chroma-key synthesis scheme for video synthesis is a method in which a video is captured in a green or blue screen area, and a screen image is removed, and then another background is synthesized. High-priced technical equipment and skilled techniques for dealing with the equipment are required to synthesize two videos using the chroma-key synthesis scheme. Therefore, it is difficult for nonprofessional personal users in a video synthesis field to produce the UCC video through the video synthesis.

Meanwhile, a video file for individual use may be leaked online despite a user's intention, and thus personal privacy may be infringed. As an internet environment is generalized, personal privacy infringement comes to the fore as a serious social problem. Therefore, in the case of the personal UCC video produced in public places, it is necessary to prevent the UCC video from being leaked in despite the user's intention, thereby protecting the personal privacy.

DISCLOSURE

Technical Problem

The present invention is directed to providing a system for producing a user-selective high-definition (HD) synthesis video, which is capable of providing an intuitive user interface and a simple production environment to allow a user to easily perform video synthesis using a chroma-key method, and also protecting personal privacy when the system is used in public places.

Technical Solution

One aspect of the present invention provides a system for producing a user-selective high-definition (HD) synthesis video, including a camera device configured to provide HD video data captured for chroma-key synthesis, an audio device configured to provide HD audio data, and a system main body configured to receive the HD video data and the HD audio data from the camera device and the audio device, to synthesize, in real-time, the HD video data and the HD audio data with background video data or background image data selected by a user into an HD video using a chroma-key synthesis scheme, and to selectively store the HD synthesis video data in an external memory device, wherein the system main body includes a main body housing having a stand structure, a main body display device having a touch screen installed on the main body housing, and configured to display a user interface for synthesizing and storing a video and a synthesized HD video, a display controller connected with the main body display device and to which one or more external display devices is connectable, a storage device in which a user-selective background video file and a background image file are stored, a connection port configured to connect to the external memory device, and a controller configured to indicate a video or an image selected from the storage device as a background through a user interface screen, to synthesize, in real-time, the HD video data and the HD audio data input through the camera device and the audio device with the video or the image selected as the background, to store the HD synthesis video in the external memory device, to display, in real-time, the HD synthesis video on the main body display device, and also to selectively display the HD synthesis video on the external display device.

The system main body may further include a communication part configured to transfer the synthesized HD video through e-mail.

The system main body may further include a photograph output device configured to output one image frame selected from the synthesized HD video as a photograph.

Advantageous Effects

According to the system for producing the user-selective high-definition (HD) synthesis video of the present invention, the user can easily produce an HD synthesis video through a touch screen and an intuitive user interface using a chroma-key method, and personal privacy can be protected by storing, in real-time, a user's personal HD synthesis video in an external memory device owned by the user without having to store the user's personal HD synthesis video in the system main body. Also, the system main body provided in a stand type can be easily provided and used in public places, can transmit the HD synthesis video as e-mail through an Internet network, and can output a desired video frame from a desired HD synthesis video as a photograph.

MODES OF THE INVENTION

Figure 1:
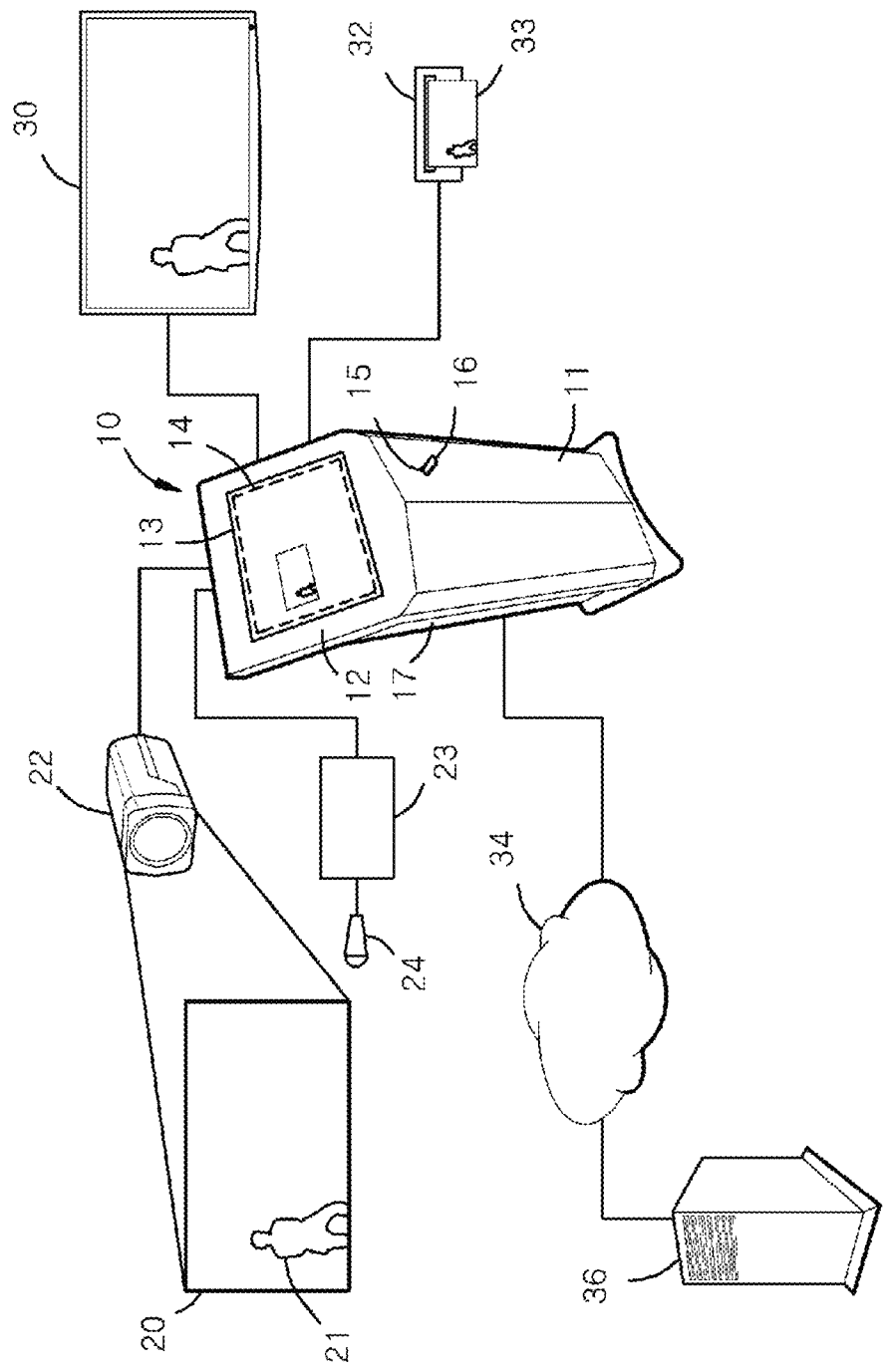
FIG. 1 is a schematic block diagram of a system for producing a user-selective high-definition (HD) synthesis video according to a preferable embodiment of the present invention.

Exemplary embodiments of the present invention will be described in detail with reference to the accompanying drawings. However, the present invention is not limited to the exemplary embodiments disclosed below, but can be implemented in various forms. The following exemplary embodiments are described in order to enable those of ordinary skill in the art to embody and practice the invention. Therefore, sizes and shapes of construction elements shown in the drawings may be exaggerated for the sake of convenience and clarity. Like reference numerals may refer to like or corresponding elements throughout the drawings. Detailed descriptions of well-known functions or constructions will be omitted since they would obscure the invention with unnecessary detail.

FIG. 1 is a schematic block diagram of a system for producing a user-selective high-definition (HD) synthesis video according to a preferable embodiment of the present invention.

Referring to FIG. 1, the system for producing the user-selective HD synthesis video according to the preferable embodiment of the present invention includes a camera device 22 which provides HD video data captured for chroma-key synthesis, an audio device 23 which provides HD audio data, and a system main body 10 which receives the HD video data and the HD audio data from the camera device 22 and the audio device 23, synthesizes, in real-time, the HD video data and the HD audio data with background video data or background image data selected by a user into an HD video using a chroma-key synthesis scheme, and selectively stores the HD synthesis video data in an external memory device 16.

The camera device 22 is a device which may record a video of all of Full HD/HD/standard-definition (SD) specifications, and which captures an object 21 located at a recording background screen 20, and outputs the HD video data to the system main body 10. The audio device 23 is a device which may output the HD audio data to the system main body 10, and may be integrally or separately provide with the camera device 22.

A main body housing 11 having a stand structure and a main body display device 13 having a touch screen 14 provided thereon are installed at the system main body 10. The main body display device 13 displays a user interface for synthesizing and storing an HD video, and a user input is performed through the touch screen 14. The main body display device 13 displays a HD synthesis video which is synthesized in real-time. In the case in which a subsidiary display device 30 is connected thereto, the HD synthesis video may be displayed therethrough.

In the system main body 10, a connection port 15 for connecting the external memory device 16 is provided at one surface of the main body housing 11. The HD synthesis video which is synthesized in real-time is stored as a video file in the external memory device 16 by default to protect a user's personal privacy. For example, a universal serial bus (USB) memory device may be used as the external memory device 16. The system main body 10 may be connected to an Internet network, and the user may transfer a HD synthesis video file to an e-mail server 36 through the Internet network. A photograph output device 32 may be connected to the system main body 10. The user may output a frame selected from the HD synthesis video as a photograph 33.

Figure 2:
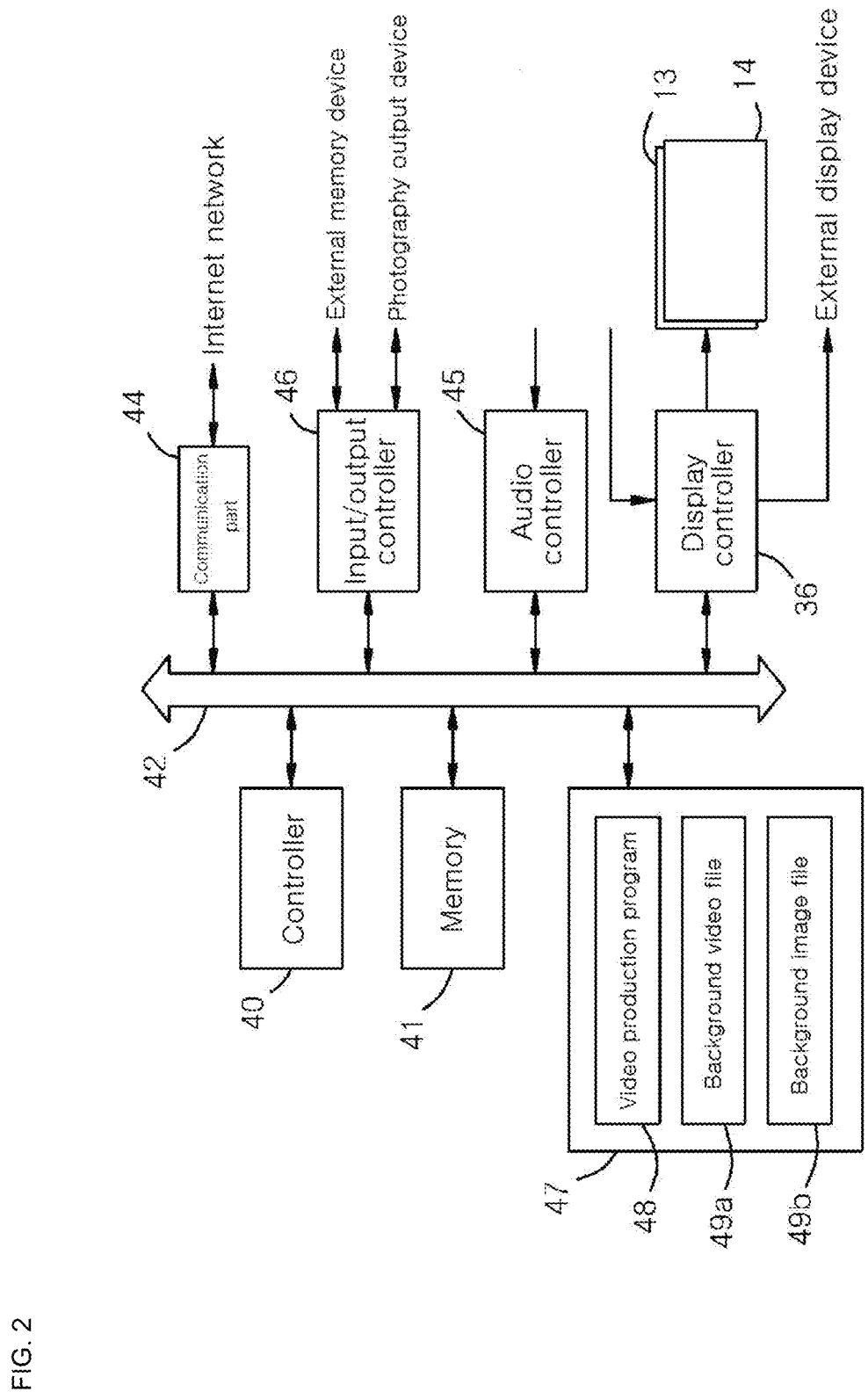
FIG. 2 is a block diagram illustrating an internal configuration of a system main body of FIG. 1.

FIG. 2 is a block diagram illustrating an internal configuration of the system main body of FIG. 1.

Referring to FIG. 2, the system main body 10 includes a display controller 43, an audio controller 45, an input/output port 46, a memory 41, a storage device 47, a controller 40, and a communication part 44 which are connected to a system bus 42. The controller 40 may be configured with a micro-processor. The storage device 47 stores a background video file 49a, a background image file 49b, and a video production program 48. The video production program 48 may be provided in the form of a firmware in a separate read-only-memory (ROM), instead of the storage device 47.

The main body display device 13 is connected to the display controller 43, and one or more external display devices 30 may be connected thereto. The display controller 43 outputs and displays the HD synthesis video, which is synthesized in real-time, through the main body display device 13 by default, but may also output and display the HD synthesis video through the external display devices 30. The display controller 43 is connected with the camera device 22, and receives the HD video data which is recorded in real-time. The audio controller 45 receives the HD audio data from the external audio device 23, and is connected with an internal speaker 17. The input/output port 46 may be connected to the external memory device 16, and may also be connected with the photograph output device 32 for outputting the photograph. The communication part 44 is connected with the Internet network 34.

A plurality of background video files 49a and a plurality of background image files 49b are stored in the storage device 47. The user may select a desired file, which will be used as a background, from the background video files 49a or the background image files 49b, and may produce the HD synthesis video. For example, the storage device 47 may be configured with a hard disc drive, and stores the video production program 48 for producing the HD synthesis video. When the system main body 10 is operated, the video production program 48 is loaded into the memory 41, and the controller 40 operates the video production program 48.

The controller 40 indicates a video or an image selected from the storage device 47 as the background through a user interface screen displayed on the main body display device 13. The HD video data and the HD audio data input through the camera device 22 and the audio device 23 are synthesized, in real-time, with the video or the image selected as the background, and then stored in the external memory device 16. The HD synthesis video which is synthesized in real-time is displayed, in real-time, on the main body display device 13, and is also selectively displayed on the external display device 30.

Figure 3:
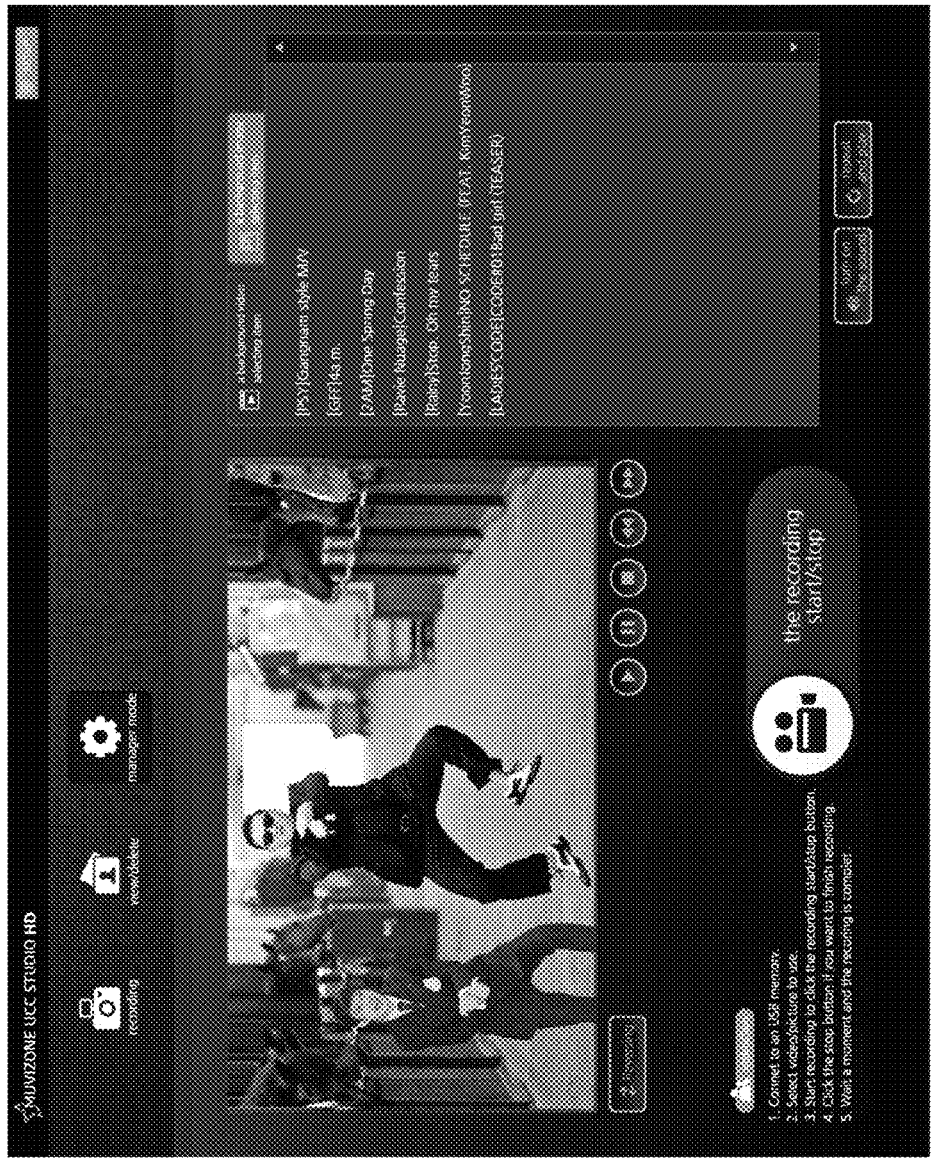
FIG. 3 an exemplary view illustrating a configuration of a recording screen user interface provided in a video production program.

FIG. 3 an exemplary view illustrating a configuration of a recording screen user interface provided from the video production program.

Referring to FIG. 3, when the video production program 48 is driven, a recording screen user interface 50 as a user interface for producing a user-selective HD synthesis video is displayed on the main body display device 13. A recording menu button 51a, a view/delete menu button 51b, and a manager mode menu button 51c are provided as main selection menus 51 on the top of the screen. When the recording menu button 51a is selected, the recording screen user interface 50 is displayed, and a HD synthesis video player 52, a background selecting item 54, and a recording start/stop button 55 are provided thereon.

The background selecting item 54 includes a background video selecting item 54a and a background image selecting item 54b, and the user may select the video or the image, which will be used as the background, using these selecting items. The selected background video or background image is synthesized, in real-time, with a video captured by the camera device 22, and then displayed through the HD synthesis video player 52.

Figure 4:
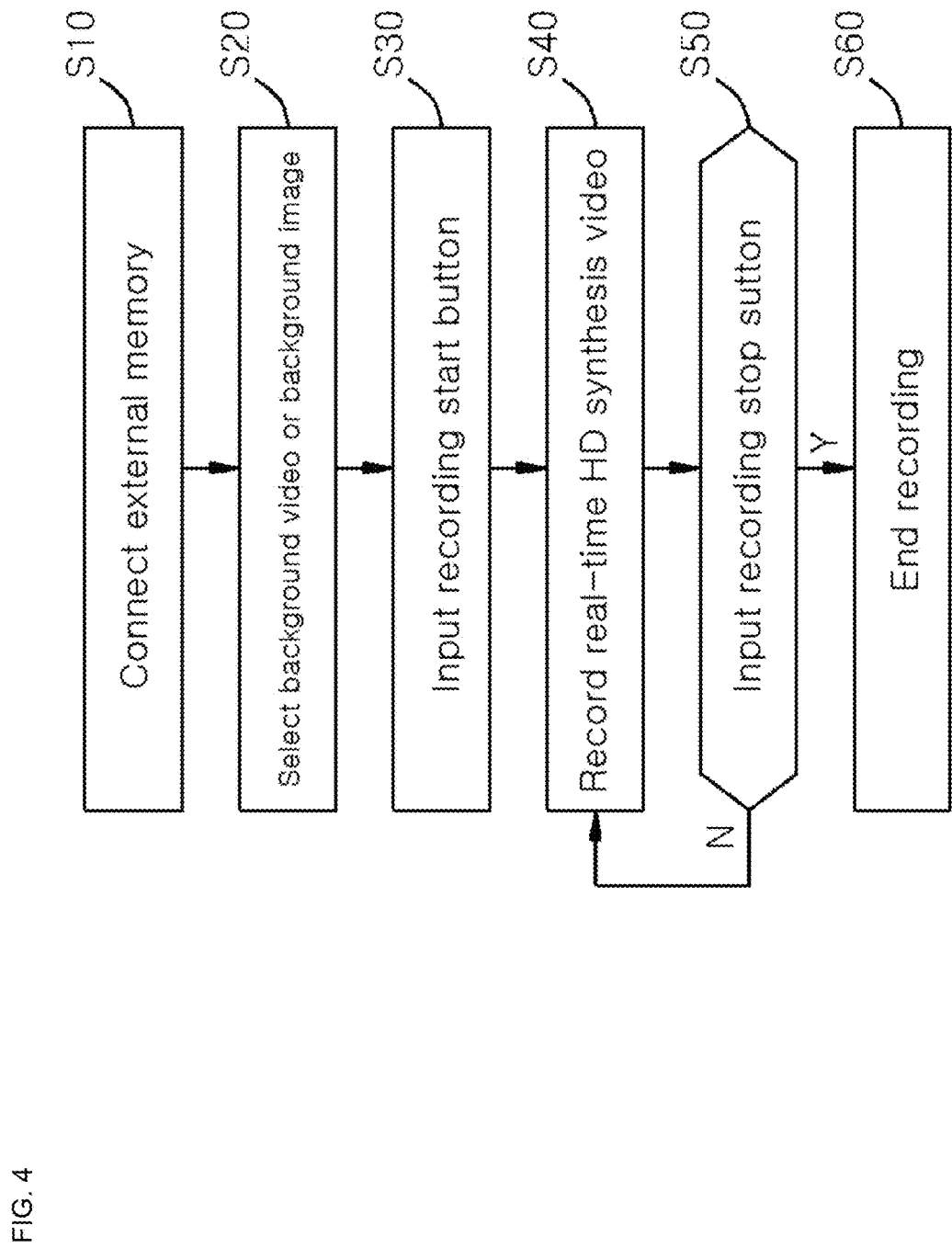
FIG. 4 is a flowchart sequentially illustrating a video recording process through real-time video synthesis.

FIG. 4 is a flowchart sequentially illustrating a video recording process through real-time video synthesis.

Referring to FIG. 4, in an operation S10, the user connects the external memory device 16 with the external memory connection port 15 of the system main body 10. Then, in an operation S20, the background video or the background image which will be used as the background is selected in the background selecting item 54 of the recording screen user interface 50. After the background video or the background image which will be used as the background is selected, when the recording start/stop button 55 is input in an operation S30, recording of a real-time HD synthesis video is performed in an operation S40. When the recording start/stop button 55 is input in an operation S50 while the recording is performed, the recording is ended in an operation S60. The HD synthesis video recorded as described above is stored in the form of a video file in the external memory device 16. The stored HD synthesis video file may be replayed or deleted through a view/delete menu.

Figure 5:
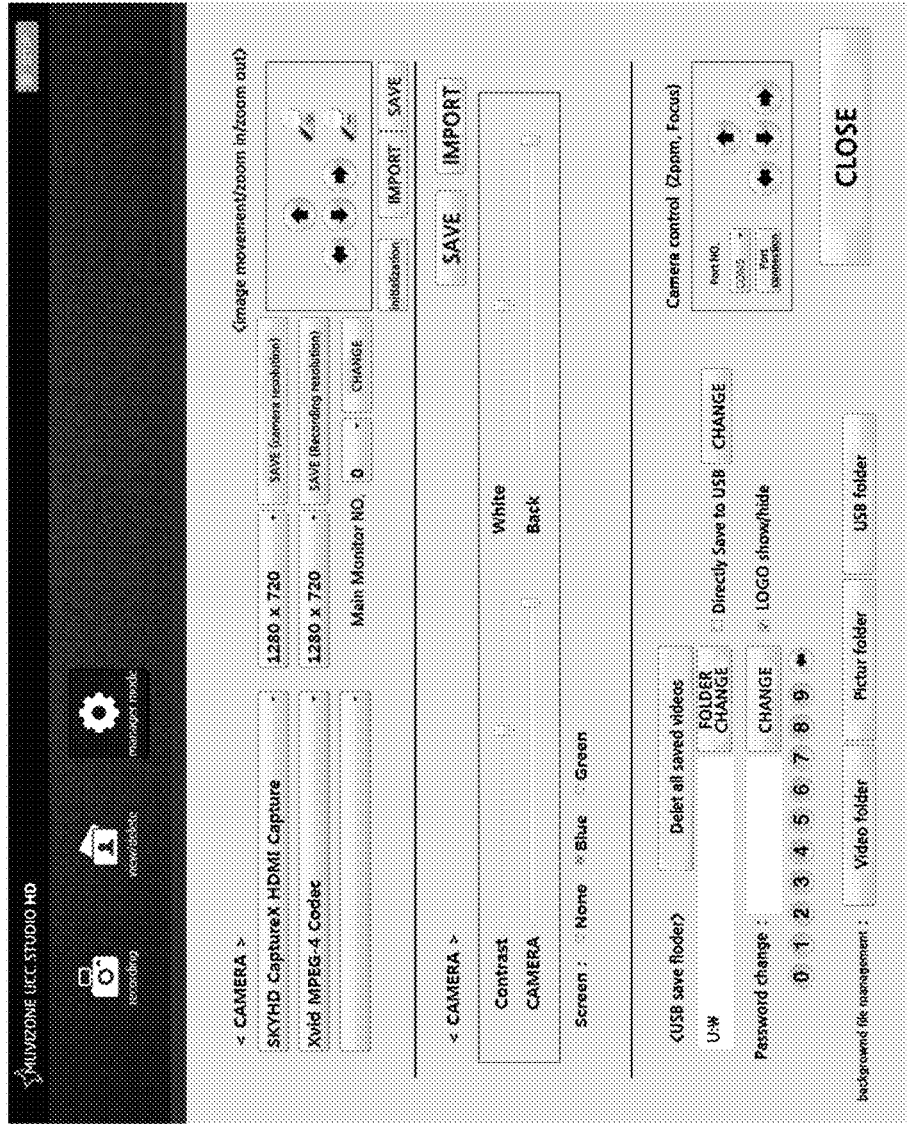
FIG. 5 is a view illustrating a configuration of a manager setting user interface provided in the video production program.

FIG. 5 is a view illustrating a configuration of a manager setting user interface provided from the video production program.

Referring to FIG. 5, when the manager mode menu button 51c is selected from the main selection menus 51, a manager setting user interface 60 is displayed on the main body display device 13. The manager setting user interface 60 provides a camera resolution and recording resolution selecting item 61, a recording video location/size setting item 62, a chroma-key setting item 63, a camera zoom/focus setting item 64, an external memory storage option item 65, a manager password setting item 66, and a background file managing item 67. The user may perform a setting of various items for the real-time HD video synthesis using the manager setting user interface 60.

It has been described a specific embodiment of the system for producing the user-selective HD synthesis video according to the present invention, which is merely an example, and various substitutions, changes or modifications in the present invention as described above can be realized by one of ordinary skill in the art to which this invention belongs without departing from the technical spirit or the essential characteristics of the present invention, and thus the above-mentioned embodiments are not limiting. Therefore, the technical scope of the present invention should be defined by the technical spirit of the accompanying claims. Also, it should be understood that the present invention comprises all equivalents and substitutes included in the technical scope and spirit of the invention.

INDUSTRIAL APPLICABILITY

The present invention relates to a system for producing a user-selective high-definition (HD) synthesis video, which synthesizes, in real-time, a video captured by a camera with a background video or a background image selected by the user using a chroma-key synthesis scheme, and stores, in real-time, the synthesized HD video in an external memory device to protect the user's personal privacy, and can be widely used in various fields, such as an advertising industry, an amusement industry and a marketing field, which require video editing and producing.

The invention claimed is:

1. A system for producing a user-selective high-definition (HD) synthesis video, comprising:
   a camera device configured to provide HD video data captured for chroma-key synthesis;
   an audio device configured to provide HD audio data; and
   a system main body configured to receive the HD video data and the HD audio data from the camera device and the audio device, to synthesize, in real-time, the HD video data and the HD audio data with background video data or background image data selected by a user into an HD video using a chroma-key synthesis scheme, and to selectively store the HD synthesis video data in an external memory device,
   wherein the system main body comprises a main body housing having a stand structure; a main body display device having a touch screen installed on the main body housing, and configured to display a user interface for synthesizing and storing a video and a synthesized HD video; a display controller connected with the main body display device and to which one or more external display devices is connectable; a storage device in which a user-selective background video file and a background image file are stored; a connection port configured to connect to the external memory device; and a controller configured to indicate a video or an image selected from the storage device as a background through a user interface screen, to synthesize, in real-time, the HD video data and the HD audio data input through the camera device and the audio device with the video or the image selected as the background, to store the HD synthesis video in the external memory device, to display, in real-time, the HD synthesis video on the main body display device, and also to selectively display the HD synthesis video on the external display device.

2. The system of claim 1, wherein the system main body further comprises a communication part configured to transfer the synthesized HD video through e-mail.

3. The system of claim 1, wherein the system main body further comprises a photograph output device configured to output one image frame selected from the synthesized HD video as a photograph.

* * * * *